April 2, 1963   A. KALENIAN   3,084,317
VOLTAGE REGULATED POWER DEVICE
Original Filed Dec. 15, 1958   2 Sheets-Sheet 1
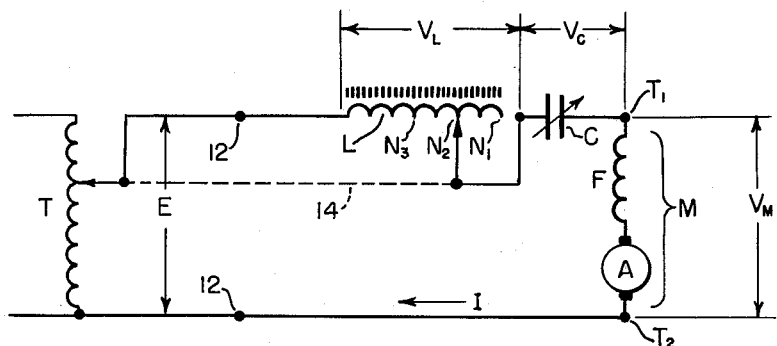
Fig. 1
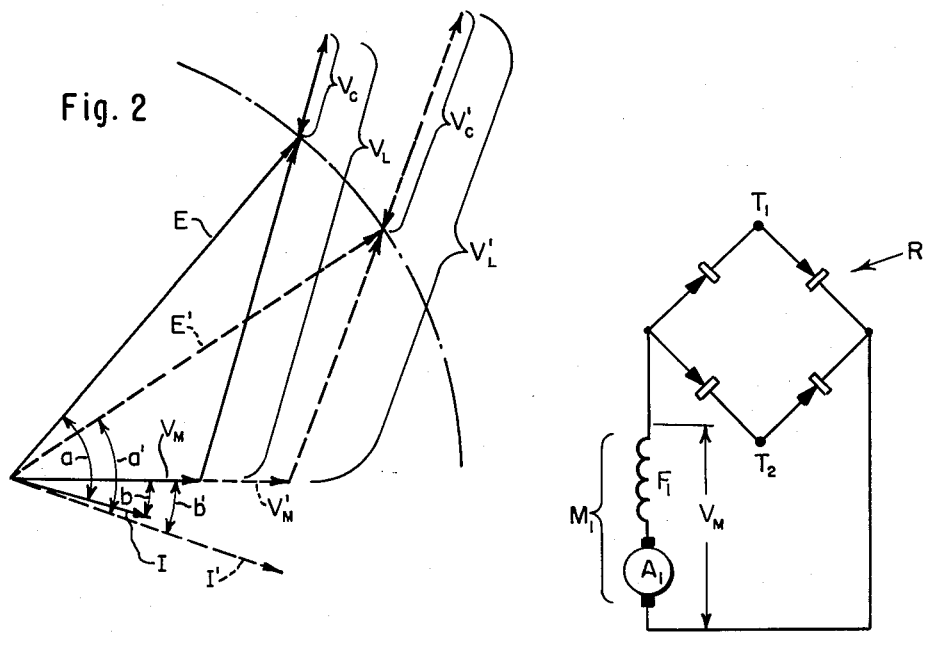
Fig. 2
Fig. 3
INVENTOR.
ARAM KALENIAN
BY KENWAY, JENNEY, WITTER & HILDRETH
ATTORNEYS April 2, 1963  A. KALENIAN  3,084,317
VOLTAGE REGULATED POWER DEVICE
Original Filed Dec. 15, 1958  2 Sheets-Sheet 2
Fig. 4
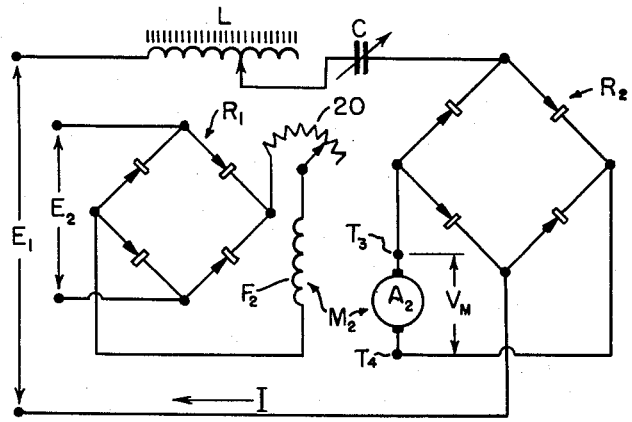
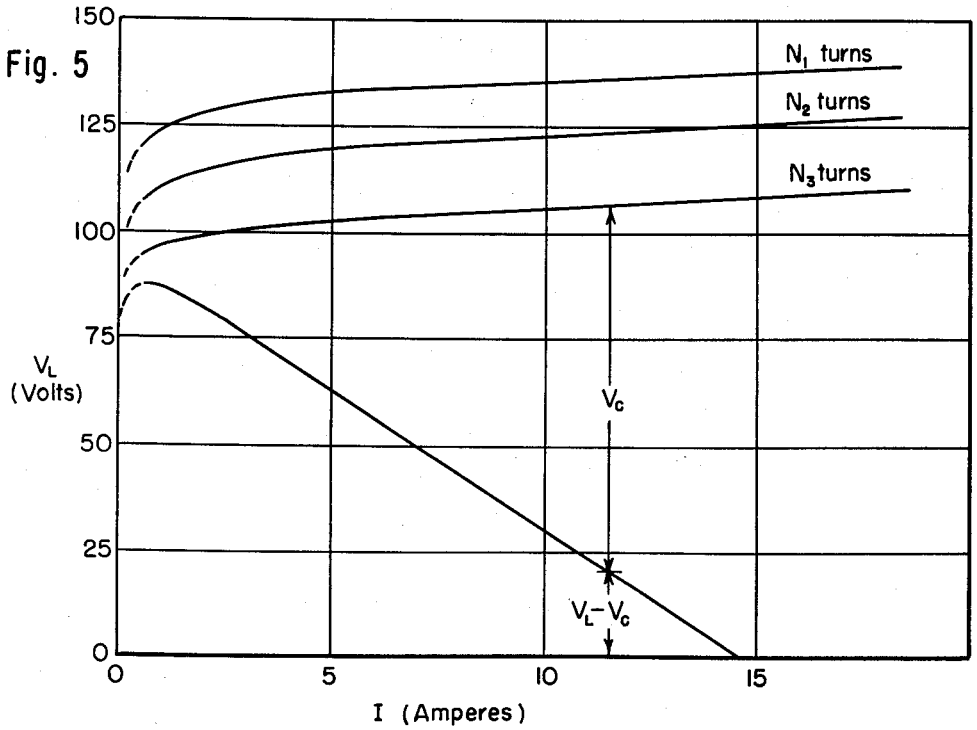
Fig. 5
*INVENTOR.*
ARAM KALENIAN
BY KENWAY, JENNEY, WITTER & HILDRETH
ATTORNEYS United States Patent Office 3,084,317
Patented Apr. 2, 1963

3,084,317
VOLTAGE REGULATED POWER DEVICE
Aram Kalenian, 7 Weld St., Westboro, Mass.
Continuation of application Ser. No. 780,322, Dec. 15, 1958. This application May 16, 1961, Ser. No. 111,425
19 Claims. (Cl. 318—249)

The present invention relates generally to motor control devices. More particularly, it relates to means including a motor and a circuit for connection of the motor to a source of alternating-current supply voltage, this circuit being adapted to vary the power supplied to the motor in a predetermined manner as a function of an applied load. This application is a continuation of my copending application Serial No. 780,322.

The principal object of this invention is to provide an automatic means to vary the voltage across the power device in a predetermined manner as a function of the applied load. In motor applications where constant speed is desired, the voltage is automatically and instantly varied by the amount required to overcome the tendency of machines to slow down with load and to preclude overspeeding when the load drops off abruptly.

A further object is to provide the foregoing results by means of circuitry having stable characteristics, whereby transitions in the value of the load effect smooth transitions in the variable parameters without instability, momentary overspeeding or other transient phenomena.

With the foregoing and other objects in view, the present invention has as its principal feature the provision of an inductance and a capacitance connected in series with a power device, the inductance having a saturable core.

Another feature resides in the selection of values for the various circuit parameters in relation to the characteristics of the given power device, including its effective impedance, its speed and the range of voltage regulation required to maintain a desired speed variation with load between specified limits.

Other features reside in certain features of the circuit and in characteristics of the elements thereof which will become clear from the following description of certain preferred embodiments, having reference to the appended drawings, in which FIG. 1 is a schematic diagram of a circuit embodying the invention as applied to a series-wound alternating-current motor; to run it at one pre-selected reasonably constant speed over the full range of no load to full load;

FIG. 2 is a vector diagram illustrating the response of various circuit parameters of FIG. 1 to a change in load conditions according to the invention;

FIG. 3 is a schematic circuit diagram illustrating a variation in the circuit of FIG. 1 for speed regulation of a series direct-current type motor operating from an alternating current power source;

FIG. 4 is a schematic diagram of a circuit embodying the invention as applied to an independently-excited direct-current motor; and FIG. 5 is a graph illustrating the impedance characteristics of the saturable core inductance according to the invention.

Referring to FIG. 1, there is illustrated a commutator-type alternating current motor M having an armature A and a series field winding F. The motor and other elements hereinafter described are connected in a circuit across terminals 12 energized by a variable voltage transformer T (shown as an auto-transformer) connected to an alternating-current power supply source. The voltage applied to the motor circuit is designated E. It is assumed that this voltage E remains substantially constant under varying load conditions of the motor M for a given selected speed of operation. In series with the motor M are connected a capacitance C and a saturable-core inductance L. The core of the inductance L is substantially fully saturated for all values of current throughout the no-load to maximum-load range of the motor. The preferred core material is one having sharp saturation characteristics as shown in FIG. 5 and hereinafter more fully described.

Inductances having sharp saturation characteristics are well-known in the art, and the intention herein is to refer to the various forms thereof generally.

As is well-known in the art, when a constant voltage source is connected directly to a typical series motor the latter has a "drooping" speed-load characteristic, that is, the speed decreases considerably as the applied load increases. However, when this type of motor is connected in the above-described circuit with constant voltage E, a different speed-load characteristic results. This may be explained by reference to FIG. 2 which is a vector diagram illustrating the various voltages identified in FIG. 1. It will be understood that this diagram is an approximation based on the assumption that the waveforms are sinusoidal. In practical applications, the waveforms often depart to a certain extent from a pure sine wave; but the illustrated principle of operation is generally applicable. The solid black vectors indicate the condition for a first assumed load. The vectors drawn in broken lines indicate the corresponding conditions resulting from a specified increase in the applied load.

Referring first to the conditions indicated by the solid lines, the applied voltage E equals the vector sum of the voltages across the inductance L, the capacitance C and the motor M, represented by voltages $V_L$, $V_C$, and $V_M$, respectively. The inductive reactances in the circuit are substantially greater than the capacitive reactance, with the result that a current I flows in lagging relationship to the voltage E. The phase angle of the voltage E to the current I is indicated by "$a$."

The motor M has a resistive-inductive effective impedance in the circuit, the in-phase or apparent resistive component being large relative to the inductive reactance. Therefore, the current lags the voltage $V_M$ by a relatively smaller angle "$b$."

The voltage $V_L$ leads the current I by nearly 90 degrees and the voltage $V_C$ lags the current I by 90 degrees. (These conditions are substantially realized in the case of practical capacitances, but ordinarily a practical inductance includes a relatively small inherent ohmic resistance. For simplicity in this explanation, this ohmic resistance is assumed to be negligible.) The vector sum of the voltages $V_L$ and $V_C$ (which sum is approximately the difference between their absolute values), adds vectorially to the voltage $V_M$ to produce a sum equal to the applied voltage E.

Next assume that the applied load increases. The resulting circuit conditions are then represented by the broken vector lines. The applied voltage E' remains equal in magnitude to the original voltage E. Since the core of the inductance L was substantially fully saturated under the original conditions the flux through the core increases but slightly, and therefore the magnitude of the voltage $V_L$ increases but slightly to the value $V_L'$. The voltage drop $V_C$, on the other hand, increases to $V_C'$ in direct proportion to the increase in current I to I'.

The foregoing changes result in a smaller phase angle "$a'$" between the applied voltage E' and the current I', with voltage vectors $V_L'$ and $V_C'$ in quadrature with the new current I'. It will be noted from FIG. 5 that while the voltage $V_L'$ has increased but slightly, the voltage $V_C'$ has increased more substantially. The voltage across the motor M increases substantially as shown by the vector $V_M'$. By appropriate selection of values for the parameters L and C, this increase in applied voltage across the motor is just sufficient to cause the speed of the motor to remain at or close to its original value.

Certain further observations may be made from FIG. 2. For example, it will be noted that the substantial increases in $V_M$ with increasing load as noted above result from the fact that $V_L$ increases but slightly throughout the current region of interest, the values of $V_C$ and $V_M$ both increasing substantially in magnitude to reach the value of the supply voltage E by vector addition. The type of inductance which best satisfies this condition is one which has a so-called "sharp" characteristic, that is, one which has a substantial current range in which the rise in voltage is small and nearly linear.

A further understanding of the procedure for utilization of this invention and the phenomena discussed above may be gained by reference to FIG. 5 which shows the voltage-current characteristic of a typical inductance L for each of three tap connections on the latter. The number of turns N included in the circuit for each curve are indicated as "$N_1$ turns," "$N_2$ turns" and "$N_3$ turns," respectively. Taking for example the curve for $N_1$ turns, it is seen that up to one ampere the voltage across the inductance rises steeply, while for currents between one and 15 amperes the voltage increases only over the range from approximately 125 to 135 volts, indicating substantially complete saturation of the core of the inductance in this latter range. For effective operation with $N_1$ turns of the inductance in circuit, the current range from no-load to maximum-load for the motor falls entirely within the saturated range.

For different numbers of turns connected in the circuit, similar curves are obtained, as indicated for $N_2$ and $N_3$, but at different voltage levels. In any case there is substantial saturation over a wide range of current.

For any given desired speed, the variable inductance L and the transformer T are placed on particular settings. The selected speed may be changed by varying L and E simultaneously. For maximum speed both the inductor L and the transformer T will include the maximum number of turns, while for lower selected speeds the number of turns on both will be reduced. In FIG. 2 the reduction of applied voltage has the effect of making the locus of E a smaller circle, and also making $V_L$ smaller for a given current. The general characteristics of the circuit are retained, however, and the same desired condition of constant speed over a wide range of load is retained.

For convenience in operation, the variations in L and E are preferably obtained by a single control, illustrated by the mechanical connection 14 in dash lines. It has been found that a simple connection giving a linear relation between the numbers of turns on L and T will afford substantial constancy of speed versus load for any setting.

The actual choice of values will depend on the actual working conditions, but the description thus far given will enable one skilled in this art to select parameters for satisfactory regulation. For example, let it be assumed that the system is to be designed for constant-speed operation of a motor driving a load having a known speed-torque characteristic. The speed and torque characteristics of the motor as functions of current will also be known, and the required values of $V_M$ for two separated values of load current can be determined (e.g. light load and full load). An inductor will be chosen that will be saturated, as shown in FIG. 5 for both of these values of load current. The voltage $V_L$ will rise somewhat over the range because the saturation is not complete. The condenser size will then be determined in a manner to reduce the quantity $V_L - V_C$ to a value to conform generally to the vector diagram of FIG. 2. There is some freedom in the choice of L and C, but as a first approximation these parameters will be chosen so that the range for $V_L - V_C$ is somewhat greater than the range for $V_M$, since it will be seen that this is necessitated by the phase relations of the vector diagram. Under these conditions, substantial constancy of speed is obtained over the full range, except possibly in the region of lightest loads.

Typical data for this condition are as follows:

[Terminal voltage (across terminals 12)—115 volts]

| I | $V_L$ | $V_C$ | $V_L - V_C$ | $V_M$ | R.p.m. |
|---|---|---|---|---|---|
| 3.2 | 112 | 28 | 84 | 53 | 2,150 |
| 6 | 117 | 48 | 69 | 68 | 1,900 |
| 9 | 120 | 70 | 50 | 80 | 1,900 |
| 12 | 123 | 92 | 31 | 88 | 1,900 |

It will be seen that the actual voltage applied to the motor ranges over about 35 volts, while voltage $V_L - V_C$ has a range of 53 volts. This voltage $V_L - V_C$ is the voltage subtracted from the line voltage by the control circuit, and if the phase angle between line and motor voltage were zero, its range would be the same as the range for $V_M$. The phase angle, however, requires a larger range for $V_L - V_C$. Except for the light-load condition, the speed is exceptionally constant over a nearly 4-to-1 range of load current.

When the motor is to be operated at various set speeds by using the variable inductor and transformer T, similar relations may be found for the different speeds, and it will be found that a linear or nearly linear relationship exists between the terminal voltage and the voltage $V_L$. It is therefore possible to connect the drives for transformer T and the inductor L together by simple gearing or other suitable mechanism (shown diagrammatically at 14) to provide a unitary control.

The condenser C, although shown as variable, will usually provide exceptionally good speed regulation under all conditions even if of constant value. The variable feature may be omitted, except where fine adjustment of speed under widely varying loads may be desired.

A feature of this invention is that the circuit inherently "fails safe." That is, if the condenser forms a short-circuit for any reason, the series inductance stops or retards the flow of current and the motor stops. Likewise, if the inductance develops an open circuit, no current flows through the circuit.

The foregoing description assumes that the motor M is of the alternating-current type. If desired, I may employ a series-wound direct-current motor and obtain results similar to those described above. In this case the circuit of FIG. 3 is substituted for the motor M between the terminals $T_1$ and $T_2$ in FIG. 1. A bridge rectifier R supplies the motor with unidirectional current. In other respects the operation is substantially the same as that described above for an alternating-current motor and the vector diagram of FIG. 2 is generally applicable. It will be understood that this form of rectifier is intended merely as exemplary, and other well-known rectifier circuits may be used equally well, the choice depending on convenience and other practical considerations.

Another embodiment of the invention is illustrated in FIG. 4. A separately-excited direct-current motor $M_2$ has its armature $A_2$ connected across a bridge rectifier $R_2$ which is connected in series with an inductance L and capacitance C in a manner similar to the motor $M_1$ of FIG. 3. The field winding $F_2$ is excited in a conventional manner by a direct current, preferably obtained by rectifying an alternating voltage $E_2$ through another full-wave bridge rectifier $R_1$.

Although the systems of FIG. 1 and FIG. 4 operate on similar principles in that an increase in load current produces an increase in voltage across the motor, there are some differences.

Since the field excitation does not change with load, the system of FIG. 4 will, in general, require a smaller range for $V_M$ for a given range of load. Thus, in the numerical example given above for FIG. 1, wherein the range for $V_M$ was about 35 volts, the corresponding range for the example given below for FIG. 4 system is about 23 volts for the power range of 33% to 133%. Since the field coil in the FIG. 4 system is not in series with the armature but is independently excited, a change in armature current is not accompanied by a change in field current. Also since the field is not in series, there is no inductive voltage drop due to the field coil and the armature gets the full benefit of the change in $V_M$. It therefore suffices to vary the inductance L only without changing the terminal voltage; or to hold the inductance constant and change the terminal voltage only in order to go from one speed setting to another.

Another difference is that the condenser in FIG. 4 will be, in general, larger in value than in FIG. 1 for the reason that a smaller range of $V_M$ will suffice to keep the motor at reasonably constant speed over the entire range from no load to full load or even a substantial overload. Thus, in the numerical example previously given for the FIG. 1 system, the value of C is about 300 mfd.; but in the separately excited motor system, the value of C ranges from 275 mfd. at the lowest speed range to 375 mfd. at the highest speed range. It can be observed from this that the greater the voltage change needed to keep the motor at constant speed over the load range, the smaller the value of C; and conversely, the smaller the voltage change required, the greater the value of C.

In the FIG. 4 system, variation of the desired speed may be obtained simply by varying inductance L only which in turn changes basic armature voltage. For extreme ranges of speed both the field current and the inductance L may be varied. Variation of the field current may be done in any suitable way, as by the use of a series resistor 20 shown in the drawing, or by varying the voltage $E_2$ with a variable transformer.

The value of C, which determines the range of $V_M$, has a reasonable degree of latitude and may be kept constant over the entire speed range with a reasonably close control of speed over the entire power range of the motor. However, if speeds must be held critically close to a predetermined setting over the range of no load to a substantial overload, it may be desirable to vary the value of C to yield the necessary $V_M$ for this purpose.

Since the FIG. 4 system has inherently a dual range of speed control, i.e., armature control by varying inductance L and field control by varying voltage to the field coil, it is possible to obtain, in smooth and infinitely small steps, a speed change in the ratio of 40:1 or more, and for each speed setting substantially constant speed will be obtained over a load range of nearly no load to considerable overload.

Typical test results on a separately excited ¾ H.P. motor having a base speed of 850 r.p.m. and rated full load current of 7.46 amperes are as follows:

[Terminal voltage—230 volts A.C. Field—120 volts D.C.]

| I | $V_L$ | $V_C$ | $V_L-V_C$ | $V_M$ (D.C.) | R.p.m. |
|---|---|---|---|---|---|
| 2.5 | 180 | 15 | 165 | 72 | 620 |
| 5.0 | 190 | 30 | 160 | 80 | 620 |
| 7.5 | 200 | 44 | 156 | 87 | 615 |
| 10.0 | 210 | 58 | 152 | 95 | 620 |

In this test a 350 mfd. condenser was used. For higher speeds a somewhat larger condenser is preferably used; for example at 1200 r.p.m. and above it is preferred to increase the condenser to 375 mfd. This results from the fact that the motor characteristics at these speeds require a smaller range of $V_M$ over the range of load.

The following table shows a complete range of speed and load characteristics of the above-mentioned ¾ H.P. motor, with preferred values of capacitance. Field voltage is 120 volts D.C. except as noted.

| R.p.m., No Load | Mfd. | R.p.m., 2.5 Amps. | R.p.m., 5.0 Amps. | R.p.m., 7.5 Amps. | R.p.m., 10.0 Amps. |
|---|---|---|---|---|---|
| 240 | 275 | 50 | 30 | 35 | 40 |
| 300 | 275 | 110 | 100 | 110 | 110 |
| 375 | 275 | 210 | 200 | 210 | 220 |
| 410 | 275 | 245 | 245 | 250 | 250 |
| 500 | 300 | 340 | 340 | 340 | 330 |
| 500 | 325 | 300 | 280 | 260 | 235 |
| 600 | 325 | 420 | 400 | 380 | 360 |
| 690 | 325 | 510 | 505 | 500 | 490 |
| 810 | 325 | 630 | 630 | 630 | 620 |
| 900 | 325 | 700 | 700 | 710 | 710 |
| 1,000 | 325 | 810 | 815 | 820 | 820 |
| 1,100 | 325 | 900 | 910 | 920 | 915 |
| 1,200 | 375 | 975 | 960 | 960 | 945 |
| 1,300 | 375 | 1,060 | 1,040 | 1,040 | 1,030 |
| 1,400 | 375 | 1,150 | 1,130 | 1,130 | 1,125 |
| 1,715 [1] | 375 | 1,440 | 1,430 | 1,430 | 1,430 |
| 2,260 [2] | 375 | 2,015 | 2,010 | 2,010 | 1,990 |
| 3,820 [3] | 375 | 3,820 | 3,825 | 3,880 | 3,880 |

[1] 90 volt A.C. Field—rectified.
[2] 60 volt A.C. Field—rectified.
[3] 30 volt A.C. Field—rectified.

It will be noted that the speed regulation is exceptional over the entire speed and load range and even up to overloads of 50% or more. At no load, however, there is a slight overspeeding. This no load condition is directly related to the characteristics of this system at the knee of the saturation curve; i.e., inductance L is going through a rapid change in magnitude as it approaches the process of becoming unsaturated. It has been found that a very small increase in motor load or even a small secondary electrical load such as a 50 watt bulb in parallel with the armature circuit substantially eliminates the overspeeding condition.

The theoretical principles in FIG. 4 are in general similar to FIG. 1, except that the use of a vector diagram has perhaps somewhat less theoretical justification. At constant speed, the counter E.M.F. of the motor is constant, and since the rectified current is variable over the A.C. power cycle, the current flow to the motor occurs in the form of pulses at double the line frequency. It has been found in practice, however, that such pulses have no detrimental effect, and exceptionally close speed regulation can be obtained over a wide range of load for any given speed setting, and the speed may readily be varied over a wide range at will.

The change of $V_M$ at all ranges of speed in both the FIG. 1 and FIG. 4 systems is practically instantaneous with the change in load. The actual time lag is in the time range of approximately one-half cycle of line frequency.

In either form of system, whether series motor or separately-excited motor, constancy of speed is obtained without the use of moving parts or delicate components, and the variations in speed settings are obtained by simple and inexpensive equipment.

While the systems herein described are inherently stable over a wide range of inductance, capacitance, and input voltage over a wide range of electrical load, whereby transitions in the value of the load effect smooth and instantaneous transitions in the variable parameters without instability, it is possible to get into the instability range if one tries to operate these systems at or slightly below the knee of the saturation curve.

It will be understood that, while the invention has been described with particular reference to preferred embodiments thereof, various other modifications of the circuit and structural details can be accomplished by one skilled in this art without departing from the spirit or scope of the invention.

Having thus described the invention, I claim:

1. Apparatus for automatically regulating the speed of a motor having in combination a source of alternating-current power, and inductance having a substantially saturated core at currents in the normal range of operation, a capacitance, a motor, and connections to join the power source, the inductance, the capacitance and said motor in series.

2. The combination of a source of alternating-current power, and inductance having a substantially saturated core at currents in the normal range of operation, a capacitance, a motor having a field winding in series with an armature winding, and connections to join the power source, the inductance, the capacitance and said motor in series.

3. The combination of a source of alternating-current power, an inductance having a substantially saturated core at currents in the normal range of operation, a capacitance, rectifier means having its alternating-current terminals connected between the motor terminals, a motor having a field winding and an armature winding connected in series between the direct-current terminals of the rectifier means, and connections to join the power source, the inductance, the capacitance and said motor terminals in series.

4. An alternating current operated power device compensated for load and having a circuit for connection between a pair of terminals across which an alternating voltage is applied, said circuit having, in series connection, a capacitance, a saturable core inductance and a load element, the load element having an effective impedance which varies with load to cause the current in said circuit to vary between a no-load value and a maximum-load value, the inductance having a core which is substantially saturated throughout the current range.

5. An alternating current-operated power device compensated for load and having a circuit for connection between a pair of terminals across which an alternating voltage is applied, said circuit having, in series connection, a capacitance, a saturable core inductance and a load element, the load element having an effective impedance which varies with load to cause the current in said circuit to vary between a no-load value and a maximum-load value, the core of the inductance being substantially saturated throughout the current range between said values, and said capacitance having a value sufficient to produce a predetermined change in the voltage drop across the load element between the limits of said range.

6. An alternating current-operated motor circuit compensated for load and having a circuit for connection between a pair of terminals across which an alternating voltage is applied, said circuit having, in series connection, a capacitance, a saturable core inductance and the armature of a motor, and the inductance having a core which is substantially fully saturated throughout the current range from the no-load to full-load values.

7. An alternating current-operated motor circuit compensated for load and having a circuit for connection between a pair of terminals across which an alternating voltage is applied, said circuit having, in series connection, a capacitance, a saturable core inductance and the armature of a motor, and a separately-excited field for the motor, the inductance having a core which is substantially fully saturated throughout the current range from the no-load to full-load values.

8. An alternating current-operated motor circuit compensated for load and having a circuit for connection between a pair of terminals across which an alternating voltage is applied, said circuit having, in series connection, a capacitance, a saturable core inductance and rectifying means, a motor having its armature connected to be energized by current from the rectifying means, and means for separately exciting the motor field, the inductance having a core which is substantially fully saturated throughout the current range from the no-load to full-load values.

9. An alternating current-operated motor circuit compensated for load and having a circuit for connection between a pair of terminals across which an alternating voltage is applied, said circuit having, in series connection, a capacitance, a saturable core reactor and a bridge-type rectifier, a direct-current motor having its armature connected across the rectifier, and means for separately exciting the motor field, the inductance having a core which is substantially fully saturated throughout the current range from the no-load to full-load values.

10. The combination according to claim 8, in which the inductance is variable to change the speed setting.

11. The combination according to claim 8, in which the voltage applied to said terminals is variable to vary the speed setting.

12. Apparatus according to claim 7, in which the inductance and capacitance are of such values that the voltage across the inductance is greater than the voltage across the capacitance throughout the operating range of the motor.

13. Apparatus according to claim 8, in which the inductance and capacitance are of such values that the voltage across the inductance is greater than the voltage across the capacitance throughout the operating range of the motor.

14. An alternating current-operated motor circuit compensated for load and having a circuit for connection between a pair of terminals across which an alternating voltage is applied, said circuit having a saturable reactor which has an approximately constant voltage drop across it over a range of current therethrough, a capacitance in series with the reactor, and a motor armature energized by current through said reactor and capacitance.

15. An alternating current-operated motor circuit compensated for load and having a circuit for connection between a pair of terminals across which an alternating voltage is applied, said circuit having a saturable reactor, means for varying the impedance of the reactor, the reactor having, for any given inductance setting, an approximately constant voltage drop across it over a range of current therethrough, a capacitance in series with the reactor, and a motor armature energized by current through said reactor and capacitance.

16. An alternating current-operated motor circuit compensated for load and having a circuit for connection between a pair of terminals across which an alternating voltage is applied, said circuit having a saturable reactor, means for varying the number of turns of the reactor, the reactor having, for any given number of turns, an approximately constant voltage drop across it over a range of current therethrough, a capacitance in series with the reactor, and a motor armature energized by current through said reactor and capacitance.

17. An alternating current-operated motor circuit compensated for load and having a circuit for connection between a pair of terminals across which an alternating voltage is applied, said circuit having a saturable reactor which has an approximately constant voltage drop across it over a range of current therethrough, variable transformer means for varying the voltage across said pair of terminals, a capacitance in series with the reactor, a motor armature energized by current through said reactor and capacitance.

18. An alternating current-operated motor circuit compensated for load and having a circuit for connection between a pair of terminals across which an alternating voltage is applied, said circuit having a saturable reactor, means for varying the impedance of the reactor, the reactor having, for any given inductance setting, an approximately constant voltage drop across it over a range of current therethrough, variable transformer means for varying the voltage across said pair of terminals, a capacitance in series with the reactor, a motor armature energized by current through said reactor and capacitance, and a connection to cause simultaneous variation of said impedance and transformer.

19. An alternating current-operated motor circuit compensated for load and having a circuit for connection between a pair of terminals across which an alternating voltage is applied, said circuit having a saturable reactor, means for varying the number of turns of the reactor, the reactor having, for any given number of turns, an approximately constant voltage drop across it over a range of current therethrough, and a connection between said transformer and reactor to cause simultaneous variation of the transformer voltage and the number of turns of the reactor.

References Cited in the file of this patent

UNITED STATES PATENTS

| | | |
|---|---|---|
| 1,325,324 | Holliday | Dec. 16, 1919 |
| 1,994,325 | Suits | Mar. 12, 1935 |